US006371151B1

(12) United States Patent
Saylor

(10) Patent No.: US 6,371,151 B1
(45) Date of Patent: Apr. 16, 2002

(54) FUEL TANK CONTROL FOR TRACTOR TRAILORS

(75) Inventor: Frank Saylor, Hollsopple, PA (US)

(73) Assignee: Saylor Industries, Holsopple, PA (US)

( * ) Notice: Subject to any disclaimer, the term of this patent is extended or adjusted under 35 U.S.C. 154(b) by 0 days.

(21) Appl. No.: 09/761,821

(22) Filed: Jan. 18, 2001

(51) Int. Cl.[7] .................................................. F16K 11/07
(52) U.S. Cl. .............................. 137/119.08; 137/569.29
(58) Field of Search ............................ 137/109, 119.01, 137/119.08, 595, 597, 565.16, 565.29

(56) References Cited

U.S. PATENT DOCUMENTS 357,191 A 2/1887 Fell
3,370,513 A 2/1968 Shore
4,131,142 A * 12/1978 Barr et al. .................. 137/595
4,556,077 A * 12/1985 Peyton ....................... 123/514
5,222,521 A 6/1993 Kihlberg
5,960,809 A 10/1999 Keller

* cited by examiner

*Primary Examiner*—Stephen M. Hepperle
(74) *Attorney, Agent, or Firm*—Banner & Witcoff, Ltd.

(57) ABSTRACT

A fuel tank control for controlling excess fuel in a motor vehicle having at least two fuel tanks. A first fuel tank and a second fuel tank are connected to a motor whereby fuel is supplied to the motor from one fuel tank at a time. A first fuel supply line is connected to an outlet of the first fuel tank and a second fuel supply line connected to an outlet of the second fuel tank to supply fuel to the motor. A switch controls which fuel tank is used. A fuel return line is connected to the motor to receive excess fuel. The fuel return line is connected to a valve having an internal spool to regulate which tank the fuel is to be returned. In operation, when the first fuel pump is operated, the spool is adjusted to return the excess fuel to the first fuel tank via a first outlet line and when the second fuel pump is operated, the spool is adjusted to return the excess fuel to the second fuel tank through a second outlet line. The spool is adjusted by the pressure created by the fuel in the fuel supply line.

6 Claims, 2 Drawing Sheets

FUEL TANK CONTROL FOR TRACTOR TRAILORS

FIELD OF INVENTION

The invention is related to a fuel tank control for controlling excess fuel in a motor vehicle having at least two fuel tanks.

BACKGROUND

Typically, diesel trucks, such as tractor trailors, have two fuel tanks. Each fuel tank has its own fuel pump. A manual or automatic switch is used to control from which fuel tank the fuel is taken. The fuel is then pumped by the trucks fuel pump to the motor.

A fuel injected diesel motor, for example, does not use all of the fuel that is supplied by the fuel pump of the individual tank. The excess fuel must be removed from the injection system of the motor and returned to one of the two fuel tanks. Preferably, the fuel is returned to the fuel tank from which the fuel is taken in order to avoid overflow in a full tank. Typically this is done through a return line that is connected to a valve. The valve operates to allow the fuel to return to only one of the two fuel tanks, preferably to that tank from which the fuel was originally taken from.

Typically, there are two switches in the cab of the truck, one to select the fuel tank, and one to select the tank for the return fuel. A frequent problem has been the operator forgetting to switch both switches so that the excess fuel is returned to a full tank instead of the tank that is being emptied. This causes overflow or fuel backup problems.

One solution to the manual control has been the electronic control. That is, when the operator in the truck cab manually switches from one tank to the other, an electronic switch switches the return fuel line as well. A problem with electronic switches is that they can fail and ultimately cause the same backup and overflow problems.

It is desirable to have a fuel return control system that does not rely on either manually operated switches or electronic switches to feed the excess fuel to the appropriate fuel tank.

SUMMARY OF THE INVENTION

The invention is directed to a fuel tank control for tractor trailers for recovering excess fuel delivered to the fuel injectors. The system uses a spool valve that is switched over from draining excess fuel from one tank to the other tank when the supply is switched over. The fuel delivery pressure biases the valve to the proper side for return flow to the appropriate tank.

In particular, the invention is directed to a fuel tank control for controlling excess fuel to an engine of a vehicle having at least two fuel tanks. The first fuel tank has a first fuel pump and a second fuel tank has a second fuel pump. A first fuel supply line is connected to an outlet of the first fuel pump, a second fuel supply line is connected to an outlet of the second fuel pump. Each of the first fuel supply line and second fuel supply line is connected to supply pressurized fuel to an injection system of the vehicle engine and fuel pressure to a control valve. A switch controls which fuel pump is operated. A fuel return line is connected to the motor to receive excess fuel and connected to a valve having an internal spool including at least one passage to regulate which tank the fuel is to be returned. When the first fuel pump is operated, the spool is translated to position a passage to return the excess fuel to the first fuel tank via a first outlet line and when the second fuel pump is operated, the spool is translated to position a passage to return the excess fuel to the second fuel tank through a second outlet line.

These features of the invention will be apparent upon consideration of the following detailed description thereof, presented in connection with the following drawings in which like reference numerals identify the elements throughout.

DETAILED DESCRIPTION OF THE PREFERRED EMBODIMENTS

Figure 1:
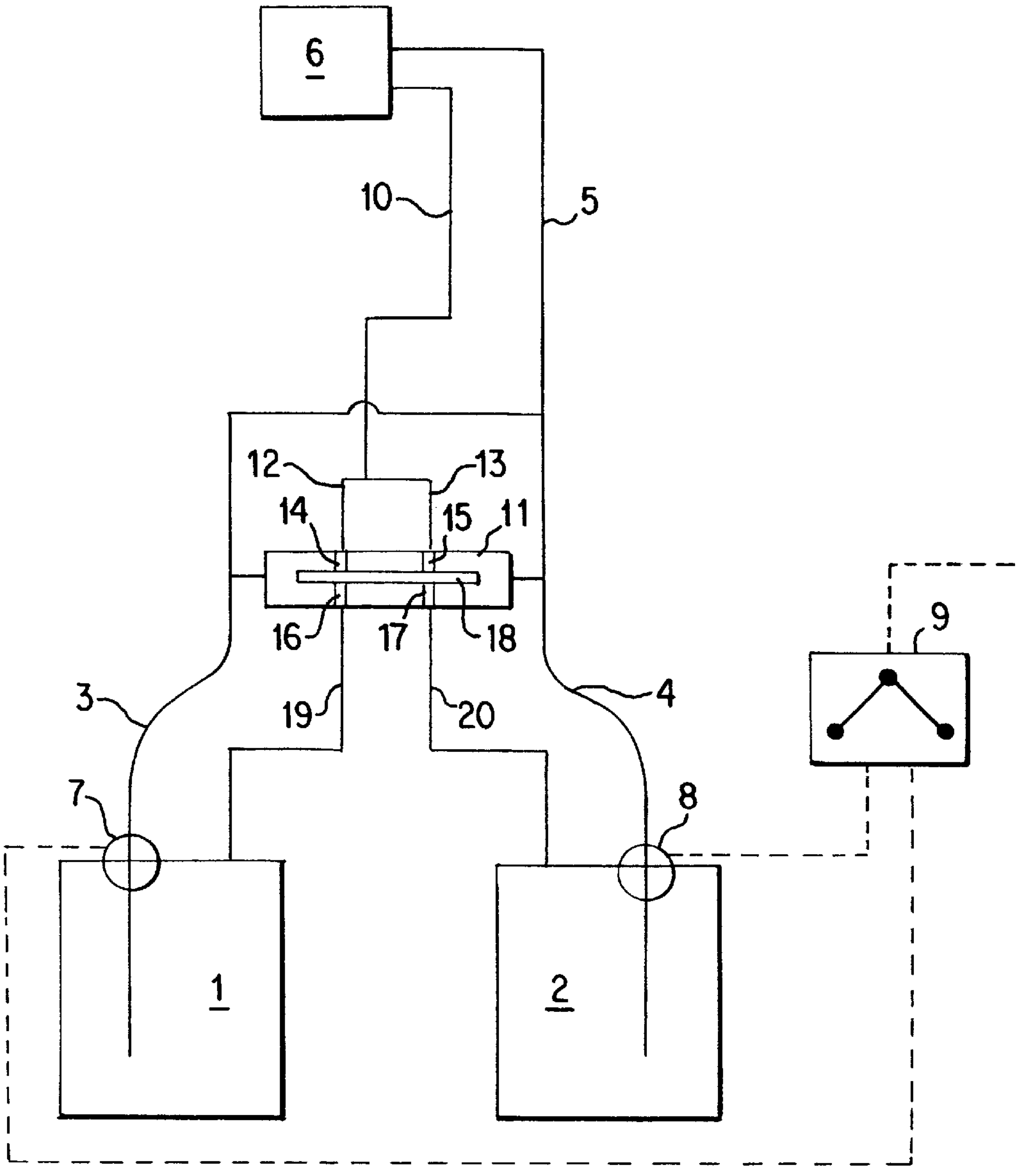
FIG. 1 depicts a fuel tank control system of the invention.

The invention is directed to a fuel tank control for controlling excess fuel in a motor vehicle having at least two fuel tanks. Turning to FIG. 1, two fuel tanks (1) and (2) are provided. A first fuel supply line (3) is connected to the outlet of the first fuel tank (1). A second fuel supply line (4) is connected to an outlet of the second fuel tank (2). The first fuel supply line and second fuel supply line are connected to supply fuel via a fuel injection supply line (5) to a motor (6). Pump (7) is used to pump the fuel out of the first tank (1) and pump (8) is used to pump the fuel out of the second tank (2).

A switch (9) is used to control which fuel pump is operated. The switch may be operated manually or automatically. An example of an automatic switch uses low fuel sensors in the tanks. When the sensor senses low fuel in one tank, it will automatically switch tanks for supply of fuel. Manual and automatic switches are known in the art and are not specifically described herein.

An excess fuel return line (10) is connected to the motor to receive excess fuel. The excess fuel return line is connected to a valve (11) to regulate which tank the fuel is being returned to. The excess fuel return line (10) is preferably split into a first line (12) and a second line (13) prior to being connected to the valve (11). The first and second lines are connected to the valve through a first inlet hole (14) and a second inlet hole (15), respectively. The valve has first outlet hole (16) and second outlet hole (17) aligned with the first and second inlet holes, respectively. The valve contains an internal spool (18) that operates to return excess fuel to the first fuel tank or the second fuel tank depending upon which tank the fuel is taken from originally.

When fuel is being taken from the first tank (1), the spool is aligned to allow fuel to flow into the first inlet hole (14), through the spool, and out the first outlet hole (16). The fuel is then returned to the first fuel tank (1) through a first outlet line (19) that is connected from the first outlet hole (16) to the first fuel tank (1). When fuel is being taken from second fuel tank (2), the spool is aligned to allow fuel to flow into the second inlet hole (15), through the spool, and out the second outlet hole (17). The fuel is then returned to the second fuel tank (2) through a second outlet line (20) that is connected from the second outlet hole (17) to the second fuel tank (2).

Figure 2:
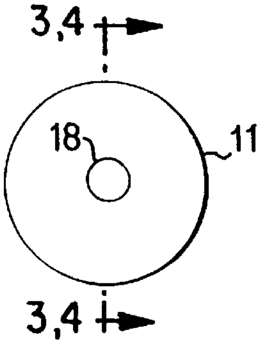
FIG. 2 depicts an end view of a spool valve useful in the fuel tank control system of the invention.
Figure 3:
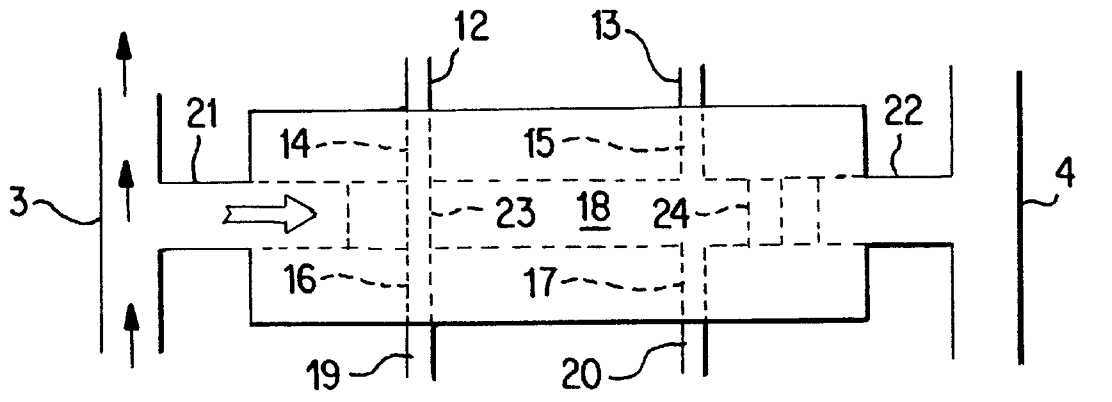
FIG. 3 depicts in cross-section a first embodiment of a spool valve useful in the fuel tank control system of the invention taken along line 3—3 of FIG. 2, including the supply and return fuel lines of the system of FIG. 1.
Figure 4:
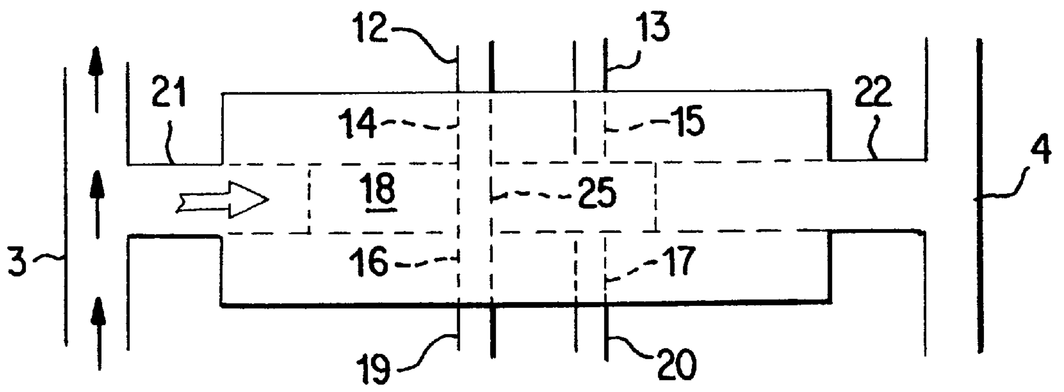
FIG. 4 depicts a second embodiment of a spool valve useful in the fuel tank control system of the invention taken along line 4—4 of FIG. 2, including the supply and return lines of the system shown in FIG. 1.

FIG. 2 shows a side view of the valves shown in FIGS. 3 and 4. Valve (11) has internal spool (18). The valve has two inlet and two outlet holes as discussed above and the internal spool (18) has at least one passage. The internal spool (18) is translated to a position so that only one passage may be used at any given time. In operation, a passage is aligned with one set of inlet and outlet holes to allow the flow of fuel through the valve.

Preferably, the spool is operated by the pressure of the fuel through the two fuel supply lines. Attention is drawn to FIG. 3. The first fuel supply line (3) is connected to one end of the valve via a T connection/line (21) and the second fuel supply line is connected to the opposite end of the valve via a T connection/line (22).

The spool contains at least one, and preferably two passages. FIG. 3 shows a two passage arrangement. The passages allow the fuel of flow through the spool either through inlet hole (14), spool passage (23), and outlet hole (16) or inlet hole (15), spool passage (24) and outlet hole (17). That is, the spool having the passages is designed so that only one of the passages can be aligned with one set of inlet and outlet holes at a time. The passage may be a hole, groove, or any other suitable passage. The spool is moveable in the direction toward and away the ends of the valve connected to supply lines (3) and (4) in order to align the appropriate passage with the appropriate inlet and outlet holes.

The spool is moved by the pressure of the fuel through either fuel line (3) or fuel line (4). For instance, when the first fuel pump (7) is operated, pressure forces of the flowing fuel forces the spool in the valve away from the first fuel supply line (3) in order to align passage (23) with inlet hole (14) and outlet hole (16). This allows the excess fuel to flow into the first fuel tank. This embodiment is shown in FIG. 2 with the solid arrow indicating the pressure forces against the spool. When the second fuel pump (8) is operated, pressure forces of the flowing fuel forces the spool in the valve away from the second fuel supply line (4) in order to align passage (24) with inlet hole (15) and outlet hole (17). This allows the excess fuel to flow into the second fuel tank.

FIG. 4 shows a spool arrangement with a single passage (25). The spool is moved to align the passage (25) with the appropriate inlet hole and outlet hole.

The fuel control system of the present invention is especially useful for diesel engines on trucks but is also useful for other motor vehicles including boats and airplanes.

While these particular embodiments of the invention and advantages has been shown and described, it is recognized the various modifications thereof will occur to those skilled in the art. Therefore, the scope of the herein-described invention shall be limited solely by the claims appended hereto.

What is claimed is:

1. A fuel tank control for controlling excess fuel to an engine of a vehicle, said vehicle having at least two fuel tanks, comprising:

a first fuel tank having a first fuel pump and a second fuel tank having a second fuel pump;

a first fuel supply line connected to an outlet of the first fuel pump, a second fuel supply line connected to an outlet of the second fuel pump, each of the first fuel supply line and second fuel supply line being connected to supply pressurized fuel to an injection system of the vehicle engine and fuel pressure to a control valve;

a switch to control which fuel pump is operated; and a fuel return line connected to the motor to receive excess fuel, said fuel return line being connected to the valve, said valve having an internal spool including at least one passage to regulate which tank the fuel is to be returned;

wherein when the first fuel pump is operated, the spool is translated to position a passage to return the excess fuel to the first fuel tank via a first outlet line and when the second fuel pump is operated, the spool is translated to position a passage to return the excess fuel to the second fuel tank through a second outlet line.

2. The fuel tank control of claim 1 wherein the fuel return line is split into a first line and a second line, the first and second lines being connected to the valve through a first inlet hole and a second inlet hole, respectively; the valve having first and second outlet holes aligned with said first and second inlet holes, respectively;

wherein the first outlet line is in communication to the first outlet hole when a passage is positioned between said first inlet and outlet holes and the second outlet line is in communication to the second outlet hole when a passage is positioned between said second inlet and outlet holes, whereby the valve operates such that fuel returning to the tanks flows either through the first inlet hole, through the spool passage, and out the first outlet hole or through the second inlet hole, through the spool passage, and out the second outlet hole.

3. The fuel tank control of claim 2 wherein the valve has first and second ends and wherein the first fuel supply means is connected to the first end of the valve and the second fuel supply means is connected to the second end of the valve, wherein when the first fuel pump is operated, the following fuel pressures forces the spool in the valve away from the first fuel supply line in order to allow a passage in said spool to align with said first inlet and outlet holes and excess fuel to flow into the first fuel tank, and wherein when the second fuel pump is operated, the flowing fuel pressure forces the spool in the valve away from the second fuel supply line in order to allow a passage in said spool to align with said second inlet and outlet holes in order to allow excess fuel to flow into the second fuel tank.

4. The control system of claim 1 wherein the at least one passage is at least one groove or hole.

5. The control system of claim 1 wherein the spool includes two grooves, a first groove being alignable with said first inlet and outlet holes of said valve, the second groove being alignable with said second inlet and outlet holes of said valve.

6. The control system of claim 1 wherein the spool includes two holes, a first hole being alignable with said first inlet and outlet holes of said valve, the second hole being alignable with said second inlet and outlet holes of said valve.

* * * * *